(12) United States Patent
Irgang et al.

(10) Patent No.: US 10,486,587 B2
(45) Date of Patent: Nov. 26, 2019

(54) ILLUMINATION ASSEMBLY FOR A VEHICLE

(71) Applicant: Rebo Lighting & Electronics, LLC, Ann Arbor, MI (US)

(72) Inventors: Todd Irgang, Saline, MI (US); Stephen Kowalchik, Dexter, MI (US); John Dominick, Ann Arbor, MI (US)

(73) Assignee: REBO LIGHTING & ELECTRONICS, LLC, Ann Arbor, MI (US)

( * ) Notice: Subject to any disclaimer, the term of this patent is extended or adjusted under 35 U.S.C. 154(b) by 247 days.

(21) Appl. No.: 15/224,595

(22) Filed: Jul. 31, 2016

(65) Prior Publication Data

US 2017/0028905 A1 Feb. 2, 2017

Related U.S. Application Data

(60) Provisional application No. 62/199,621, filed on Jul. 31, 2015.

(51) Int. Cl.
*B60Q 1/22* (2006.01)
*B60Q 1/56* (2006.01)
(Continued)

(52) U.S. Cl.
CPC ............ *B60Q 1/22* (2013.01); *B60Q 1/0041* (2013.01); *B60Q 1/2607* (2013.01); *B60Q 1/56* (2013.01); *F21S 43/14* (2018.01); *F21S 43/19* (2018.01); *F21S 43/237* (2018.01); *F21S 43/243* (2018.01); *F21S 43/247* (2018.01); *F21S 43/26* (2018.01); *F21S 43/30* (2018.01); *F21S 43/31* (2018.01); *F21S 43/315* (2018.01); *F21S 43/40* (2018.01); *G02B 6/0005* (2013.01); *G02B 6/0008* (2013.01); *G02B 6/0046* (2013.01); *F21W 2103/45* (2018.01); *F21W 2103/50* (2018.01); *F21Y 2115/10* (2016.08)

(58) Field of Classification Search
CPC .......... B60Q 1/56; B60Q 1/22; B60Q 1/2696
USPC ....................................................... 362/497
See application file for complete search history.

(56) References Cited

U.S. PATENT DOCUMENTS 6,099,156 A     8/2000  Jenkins
6,616,305 B1 *  9/2003  Simon ...................... F21V 5/02
                                                    362/268
(Continued)

FOREIGN PATENT DOCUMENTS

CN     202345573 U    7/2012
DE     10314256 A1    10/2004
(Continued)

OTHER PUBLICATIONS

International Search Report for Application No. PCT/US2016/044937 dated Nov. 8, 2016, 7 pages.
(Continued)

*Primary Examiner* — Alexander K Garlen
*Assistant Examiner* — Eric T Eide
(74) *Attorney, Agent, or Firm* — Reising Ethington, P.C.

(57) ABSTRACT

An illumination assembly for a vehicle. The assembly includes a lamp having a first light source; a first collimator adapted to receive light from the first light source; and an optical wedge, wherein the first collimator is positioned between the first light source and the optical wedge.

11 Claims, 9 Drawing Sheets

(51) Int. Cl.

| | | |
|---|---|---|
| *F21V 23/00* | (2015.01) | |
| *F21S 43/237* | (2018.01) | |
| *F21S 43/20* | (2018.01) | |
| *F21S 43/247* | (2018.01) | |
| *F21S 43/30* | (2018.01) | |
| *F21S 43/243* | (2018.01) | |
| *F21S 43/14* | (2018.01) | |
| *F21S 43/19* | (2018.01) | |
| *B60Q 1/26* | (2006.01) | |
| *F21S 43/40* | (2018.01) | |
| *F21V 8/00* | (2006.01) | |
| *F21S 43/31* | (2018.01) | |
| *B60Q 1/00* | (2006.01) | |
| *F21Y 115/10* | (2016.01) | |
| *F21W 103/50* | (2018.01) | |
| *F21W 103/45* | (2018.01) | |

(56) References Cited

U.S. PATENT DOCUMENTS

| | | | |
|---|---|---|---|
| 7,511,607 B2 | 3/2009 | Hubbard | |
| 8,029,175 B2 | 10/2011 | Koizumi | |
| 8,262,269 B2 | 9/2012 | Koizumi | |
| 8,333,495 B2 | 12/2012 | Shamitz | |
| 2002/0018350 A1* | 2/2002 | Lepley | G02B 6/0001 362/551 |
| 2003/0002179 A1 | 1/2003 | Roberts | |
| 2005/0093684 A1 | 5/2005 | Cunnien | |
| 2005/0094405 A1* | 5/2005 | Tatewaki | B60Q 1/2696 362/341 |
| 2006/0002141 A1* | 1/2006 | Ouderkirk | G02B 6/0001 362/609 |
| 2006/0028830 A1* | 2/2006 | Tsai | B60Q 1/2607 362/509 |
| 2006/0250808 A1 | 11/2006 | Verbrugh | |
| 2007/0216770 A1 | 9/2007 | Chang | |
| 2008/0130309 A1* | 6/2008 | Condon | B60Q 1/34 362/520 |
| 2009/0153663 A1 | 6/2009 | Ramos | |
| 2009/0290370 A1* | 11/2009 | Koizumi | B60Q 1/0023 362/497 |
| 2010/0217382 A1 | 8/2010 | Chau | |
| 2011/0007516 A1* | 1/2011 | Tsai | B60Q 1/2607 362/485 |
| 2011/0069505 A1* | 3/2011 | Chambers | B60Q 1/2607 362/516 |
| 2011/0313515 A1 | 12/2011 | Quadri | |
| 2012/0194678 A1 | 8/2012 | Jakobsmeyer | |
| 2012/0256544 A1 | 10/2012 | Salmen | |
| 2014/0018915 A1 | 1/2014 | Biadillah | |
| 2014/0031928 A1 | 1/2014 | Murphy | |
| 2014/0177249 A1* | 6/2014 | Iseki | B60Q 1/2665 362/511 |
| 2015/0036371 A1 | 2/2015 | Ichikawa et al. | |
| 2015/0138802 A1* | 5/2015 | Salter | B60Q 1/56 362/510 |
| 2015/0184809 A1 | 7/2015 | Kuo | |
| 2017/0234523 A1* | 8/2017 | Krijn | F21S 8/033 362/145 |

FOREIGN PATENT DOCUMENTS

| | | |
|---|---|---|
| DE | 202006011770 U1 | 10/2006 |
| DE | 102005042574 A1 | 3/2007 |
| DE | 102010045053 A1 | 3/2012 |
| DE | 102013005811 A1 | 10/2014 |
| EP | 1886871 A1 | 2/2008 |
| EP | 2088031 A2 | 8/2009 |
| EP | 2247098 A1 | 11/2010 |
| EP | 2568320 A2 | 3/2013 |
| JP | 2007145048 A | 6/2007 |
| JP | 4566121 B2 | 10/2010 |
| JP | 2013533025 A | 8/2013 |
| JP | 2013540467 A | 11/2013 |

OTHER PUBLICATIONS

Japanese Office Action for Application No. 2015188966 dated Aug. 9, 2016, 6 pages.

English Translation of Japanese Office Action for Application No. 2015188966 dated Aug. 9, 2016, 4 pages.

Supplementary European Search Report issued by the European Patent Office for application 16833659.2.

* cited by examiner

ILLUMINATION ASSEMBLY FOR A VEHICLE

This application claims the benefit of U.S. Provisional Patent Application No. 62/199,621 filed Jul. 31, 2015, the entire contents of which are hereby incorporated by reference.

TECHNICAL FIELD

This invention generally relates to an illumination assembly for a vehicle.

BACKGROUND

Rearward facing or so-called 'back-up cameras' will soon be required on all newly manufactured vehicles. The quality of the image and the data captured by such cameras can vary depending on a number of factors. For example, cameras may gather less data regarding a driver's surroundings based on, among other things, the sensitivity of the camera's detector or imager and operation in darkness or in low-light conditions.

Thus, it is desirable to improve the performance of the camera detector by illuminating a region of interest behind the vehicle so that the camera gathers more light and consequently gathers more data regarding the vehicle's surroundings.

SUMMARY

According to one embodiment of the invention, there is provided an illumination assembly for a vehicle. The assembly includes a housing; at least one light source within the housing; and a cover coupled to the housing and comprising: a planar lens having a plurality of optical elements adapted to receive light from the at least one light source and to direct the light in a first axial direction; and an axially extending light pipe adapted to receive light from the at least one light source and to direct the light in a second axial and opposite direction.

According to another embodiment of the invention, there is provided an illumination assembly for a vehicle. The assembly includes a lamp having a first light source; a first collimator adapted to receive light from the first light source; and an optical wedge, wherein the first collimator is positioned between the first light source and the optical wedge.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

An illumination assembly for a rear or tail end of an automotive vehicle is described herein. The illumination assembly may include a license plate lamp (LPL) to illuminate a license plate location, as well as a backup camera lamp (BCL) to provide illumination behind the vehicle for a rearview or backup camera or any other suitable use. In some countries, government regulations define license plate illumination standards (e.g., Federal Motor Vehicle Safety Standard (FMVSS) 108 in the United States). Similarly, some countries have or are developing specifications and/or standards for illuminating predefined regions behind the vehicle—e.g., to increase visibility and detection when using backup cameras and other similar devices, especially where tail lamp (or backup lamps) do not sufficiently illuminate regions directly behind the vehicle. According to one embodiment described below, the BCL illuminates a region directly behind the vehicle, e.g., a region of interest along a vehicle's longitudinal axis.

The illumination assembly is described below with respect to a vehicle environment; however, it should be appreciated that it may be useful in other applications as well. In many vehicle implementations, vehicle manufacturers locate the backup camera along or near a centerline of the vehicle. This minimizes user confusion or adaptation and more closely mimics an actual rearview perception of a vehicle user. The illumination assembly may accommodate a centered backup camera and may, for example, be spaced to the right or left of the centerline, or in other implementations, the illumination assembly may be centered as well. The illumination assembly may or may not include a backup camera; for example, in at least one implementation, the backup camera is a separate module. Also, in the description below, terms of relative direction and position with respect to a vehicle are used for clarity's sake. For example, terms such as "upper," "lower," "front," "rear," "above," "below," and the like, are not intended to be limiting.

Figure 1:
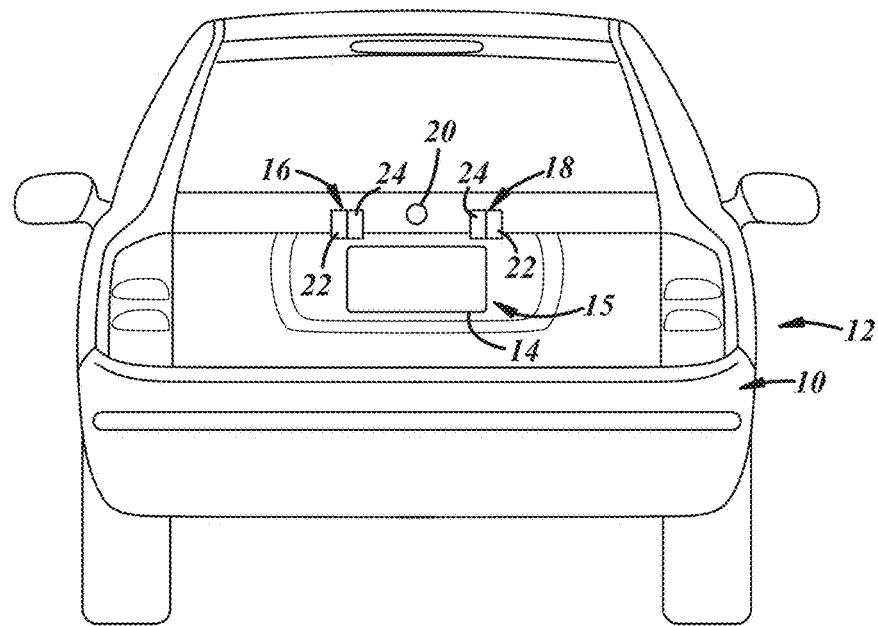
FIG. 1 is a rear view of a vehicle having a first illumination assembly, a second illumination assembly, and a vehicle license plate.

FIG. 1 illustrates a rear portion 10 of a vehicle 12 having a license plate 14 (in a license plate location 15) coupled thereon. In addition, two illumination assemblies 16, 18 schematically are shown proximate to the license plate 14, as well as a backup camera 20. Each illumination assembly comprises a backup camera lamp (BCL) 22 and a license plate lamp (LPL) 24 inboard of the BCL. While two assemblies 16, 18 are shown, some embodiments having only one such illumination assembly are possible. Only assembly 16 will be described below; however, it should be appreciated that illumination assembly 18, when implemented, may be configured as a mirror opposite of assembly 16 (e.g., so that its LPL 24 also may be inboard of the BCL 22 as shown), but in other embodiments it may be located differently, it may not include both LP and BCL, or it may not be used at all.

Figure 2:
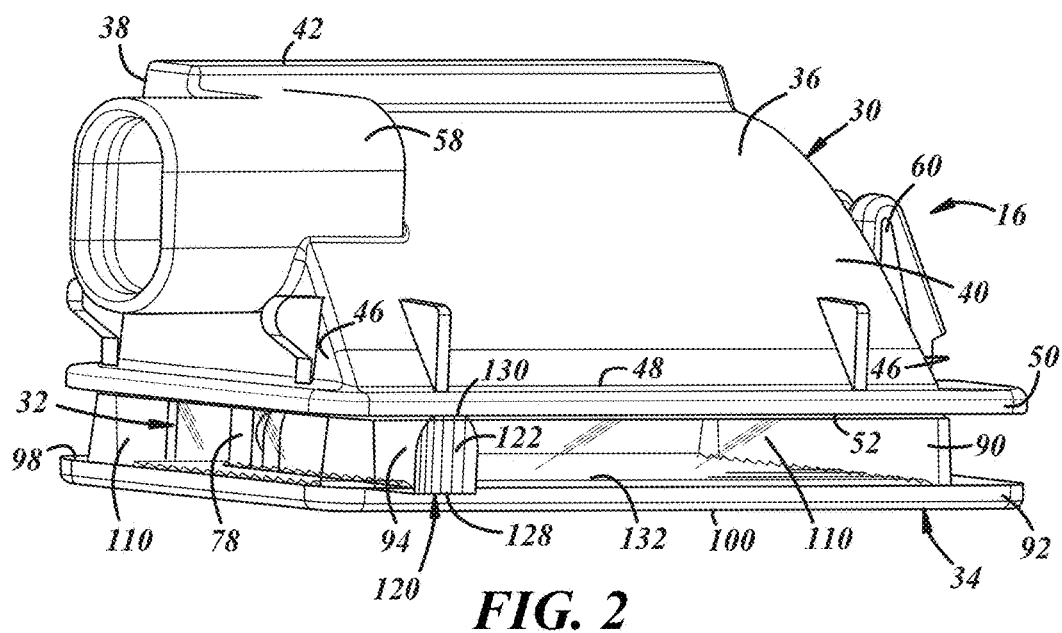
FIG. 2 is a perspective view of the first illumination assembly of FIG. 1.
Figure 3:
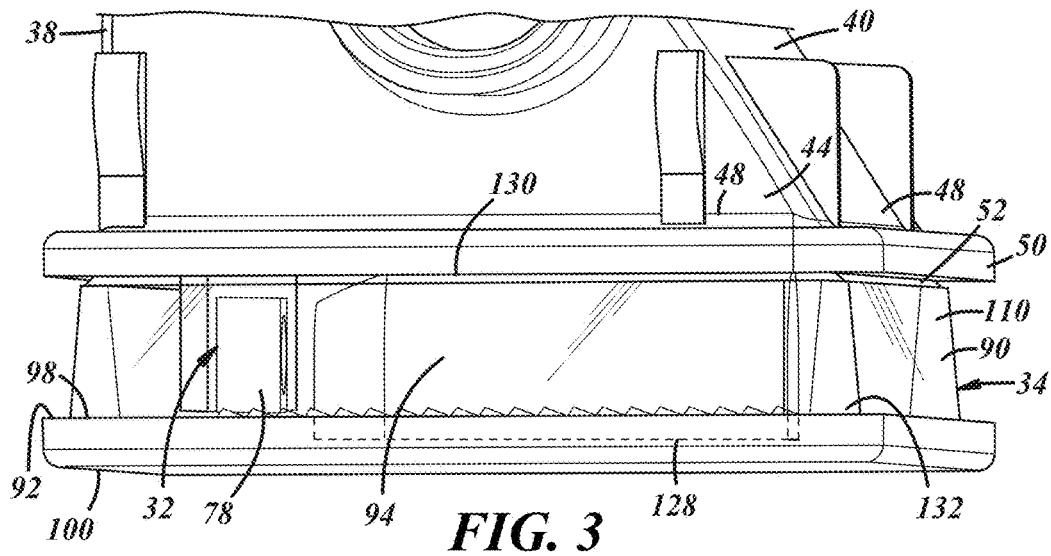
FIG. 3 is a partial perspective view of the first illumination assembly of FIG. 1.
Figure 5:
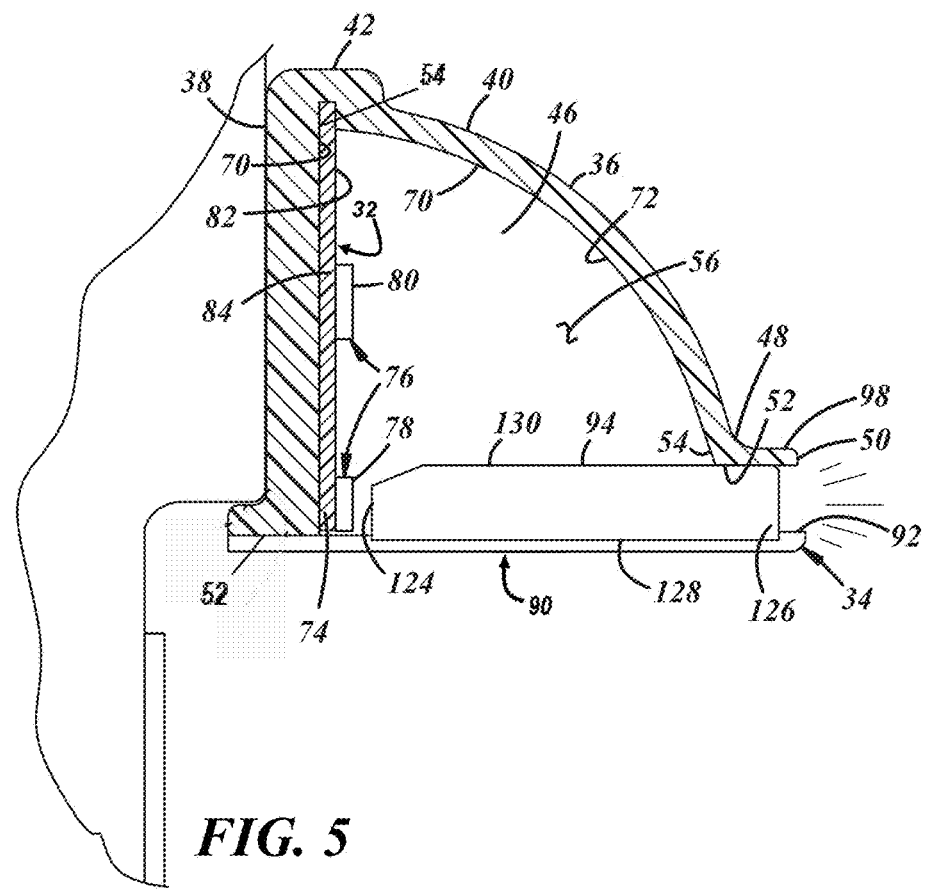
FIG. 5 is a sectional view of the first illumination assembly.
Figure 4:
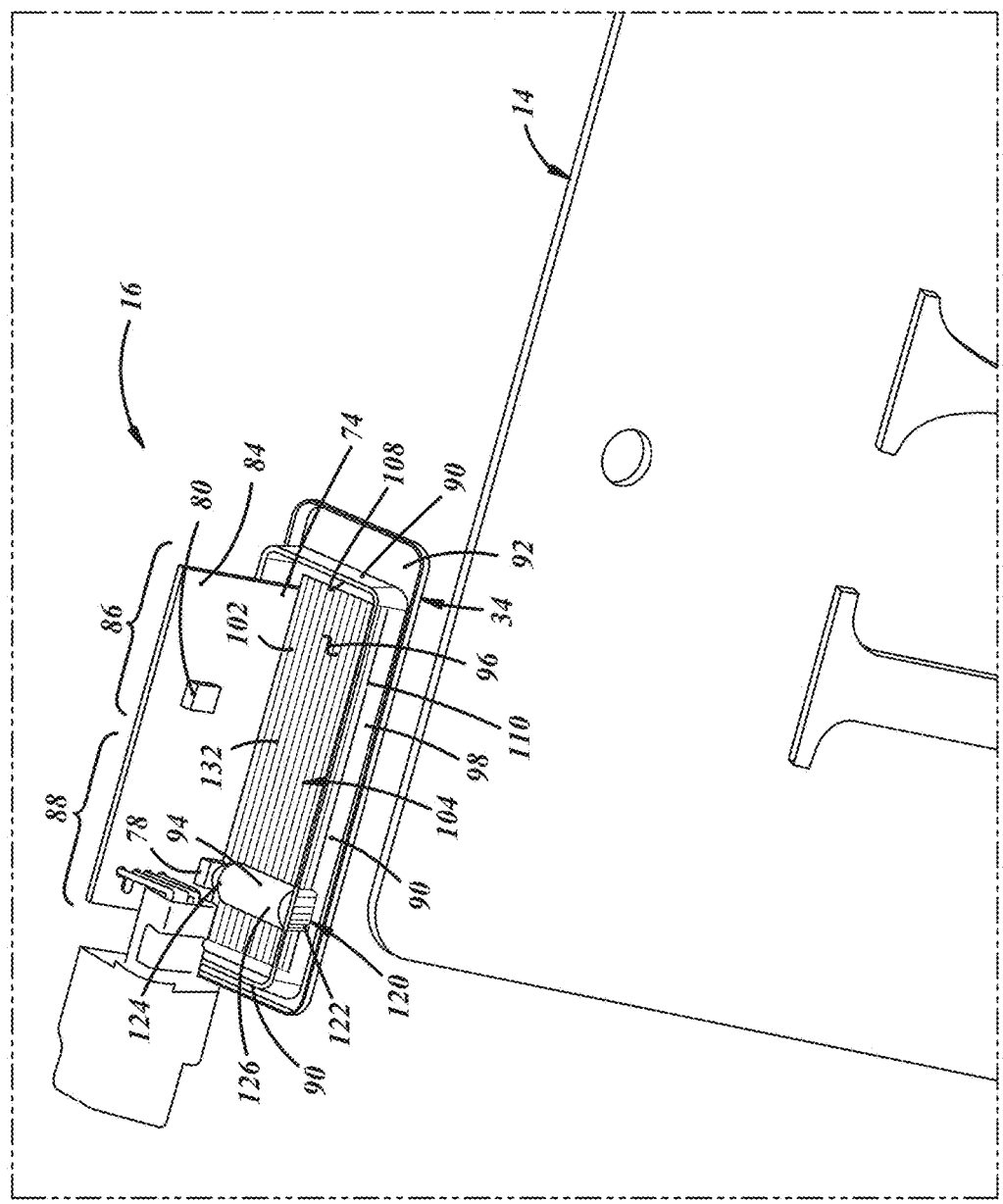
FIG. 4 is a perspective view of the license plate and the first illumination assembly of FIG. 1, the first illumination assembly shown without a housing.

Illumination assembly 16 comprises a housing 30, a control circuit card or circuit card assembly (CCA) 32, and an at least partially transparent cover 34, according to one embodiment (see FIGS. 2-4). Housing 30 may comprise a body 36 that includes a rectangular wall 38 coupled to a curved wall 40 at a first end 42 and two pie-shaped end walls 46. Opposite the first end 42, a second end 48 of each of the walls 38, 40, 46 may terminate at a circumferentially extending flange 50. Flange 50 may be generally rectangular (as shown); however, other shapes are also possible. The flange 50 includes a bottom surface or edge 52 which includes an opening 54 to a cavity 56 of the housing 30 (best shown in FIG. 5). Housing 30 may have other features as well; e.g., as shown in FIG. 2, a connector 58 for a wiring harness (not shown), one or more appurtenances 60 for coupling the assembly to the vehicle 12, etc.

Cavity 56 may be defined by a number of inner surfaces 70 associated with the walls described above, as shown in FIG. 5. At least one of the inner surfaces 70 may be a reflector or reflective surface 72. In the illustrated example, the reflector 72 is the inner surface of the curved wall 40. In general, the housing 30 may be comprised of a reflective plastic, polymer, or any other suitable material. In one implementation, the reflector 72 is metallic or a metallic coating. In other implementations, reflector 72 is merely reflective white plastic.

CCA 32 may be at least partially carried within the cavity 56 of the housing 30 (e.g., on the inner surface 70 associated with rectangular wall 38). But in at least one embodiment, a lower region 74 of CCA 32 protrudes through the opening 54 and may be coupled to the housing 30, the cover 34, or both.

CCA 32 may comprise a number of circuit elements 76 including two light sources 78, 80 carried on the circuit card—e.g., when installed in some implementations, BCL light source (78) and LPL light source (80) may be carried by CCA 32 facing vehicle rearwardly. In at least one embodiment, the light sources 78, 80 are light emitting diodes (LEDs); however, other suitable light sources are possible. CCA 32 further may include memory (not shown), a processor (not shown), and various other passive or active circuit elements (not shown) enabling the circuit card 32 to execute instructions stored on the memory—including instructions for actuation of the light sources 78, 80. For example, the processor may enable (or switch ON) LPL light source 80 under low ambient light conditions, when the vehicle running lights are actuated, or any other suitable condition. And the processor may enable (or switch ON) light source 78 under conditions when the vehicle transmission is placed in "Reverse," when a vehicle user independently actuates a control associated with the BCL 22, or any other suitable circumstance. CCA 32 described herein may be a single assembly, or in some instances, the card 32 may comprise multiple circuit card assemblies (e.g., one card carrying light source 78 and another card carrying light source 80). In addition, CCA 32 is shown as a planarly-shaped circuit card; however, other shapes are possible (e.g., curved or angular shapes having one or more card assemblies).

According to one embodiment (see FIG. 4), light source 80 is positioned on CCA 32 approximately in a middle to upper-middle region 84 on an inboard side 86 (of the CCA)—e.g., with respect to a vehicle centerline (not shown), and light source 78 is positioned in the lower region 74 of CCA 32 on an outboard side 88 (e.g., with respect to the vehicle centerline). In implementations where the CCA 32 extends out of the cavity 56 (e.g., see FIGS. 2-3 and 5), light source 80 is within the cavity 56 of the housing 30 whereas light source 78 is at least partially below flange 50 and outside of cavity 56.

Figure 6:
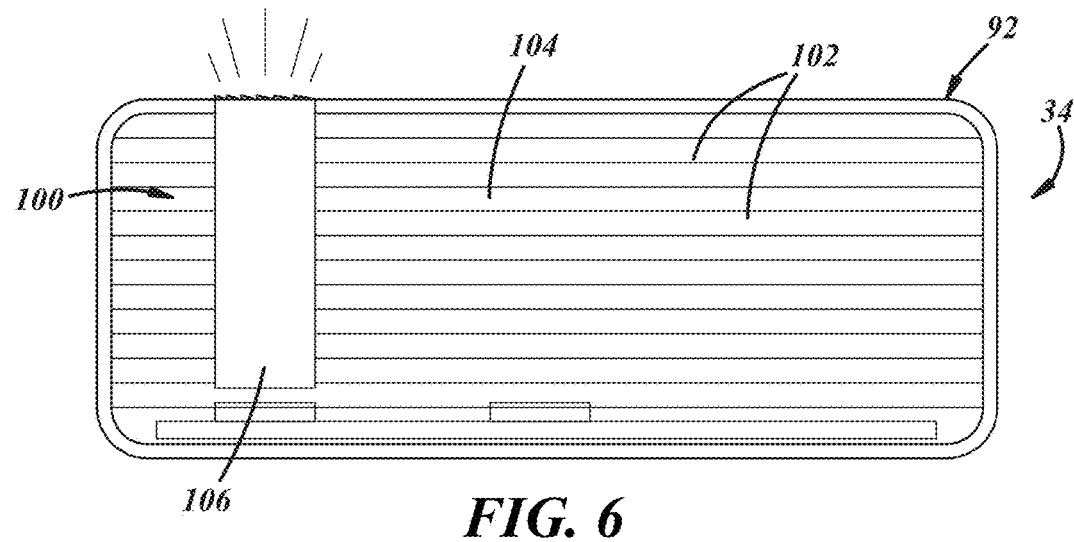
FIG. 6 is a bottom view of the first illumination assembly.

Cover 34 may include four walls 90 arranged vertically in a rectangular shape, a base or planar lens 92, and a light pipe 94 (best shown in FIG. 4). All or part of cover 34 may be transparent; suitable materials include, but are not limited to, polycarbonate, acrylic (e.g., poly(methyl methacrylate) or PMMA), and/or clear acrylonitrile butadiene styrene (ABS). In at least one embodiment, the walls 90, lens 92, and light pipe 94 are formed in a single piece of material. The four illustrated walls 90 radially extend from the bottom edge 52 of the housing 30 to the base 92 thereby defining a hollow region 96 (in the cover). Base may be rectangular as well and may have a lip 98 that extends outwardly of the walls 90. Base 92 is shown as flat; however other implementations are possible. In at least one implementation (FIG. 6), a lower side 100 of base 92 includes multiple optical elements or flutes 102 (e.g., within an inner region 104 of the lower side 100). These flutes 102 may be arranged and configured to direct light received from light source 80 (see FIG. 5) downwardly onto the vehicle license plate 14, as will be explained in greater detail below. In one implementation, a portion 106 of the base lower side 100 may be smooth; i.e., without flutes 102. This smooth portion 106 may correspond to the location of the light pipe 94 on cover 34.

Inwardly-facing surfaces 108 and outwardly-facing surfaces 110 of the walls 90 may be smooth (FIGS. 2 and 4). On the outwardly-facing surface 110 which faces vehicle-rearwardly, there may be an optic region 120 having one or more optical elements or flutes 122 (thus, this region 120 may not be smooth). As will be explained more below, these flutes 122 may be direct light received from light source 78 rearwardly to provide light for the backup camera 20.

Light pipe 94 may be located in the hollow region 96 of cover 34. Light pipe 94 may be any suitable longitudinally extending light conduit; in at least one implementation, the light pipe is solid through its diameter (i.e., not hollow). As shown best in FIGS. 4-5, a first end 124 of the light pipe 94 may be spaced from the inwardly-facing surface 108 of one wall 90 (the vehicle-forward wall) and may extend longitudinally to an opposite wall 90 (the vehicle-rearward wall)—a second end 126 of the light pipe corresponding with the optic region 120 (on the outwardly-facing surface 110 thereof). The second light source 78 (on CCA 32) may be aligned generally with the first end 124 of light pipe 94 so that light (from source 78) which enters the first end 124 may exit at the optic region 120. Accordingly to one embodiment, a cross-sectional shape of light pipe 94 may be arch-like (see FIG. 2); e.g., a bottom 128 of the arch-like shape may correspond or coincide with the smooth portion 106 on the lower side 100 of base 92, and a top 130 of the arch-like shape may extend upwardly from an upper side 132 of base 92. The height of the light pipe 94 and the height of the walls 90 (of cover 34) may be approximately the same. The shape of the light pipe 94 may promote total internal reflectance (TIR) or TIR may be at some value greater than 50%.

Figure 8:
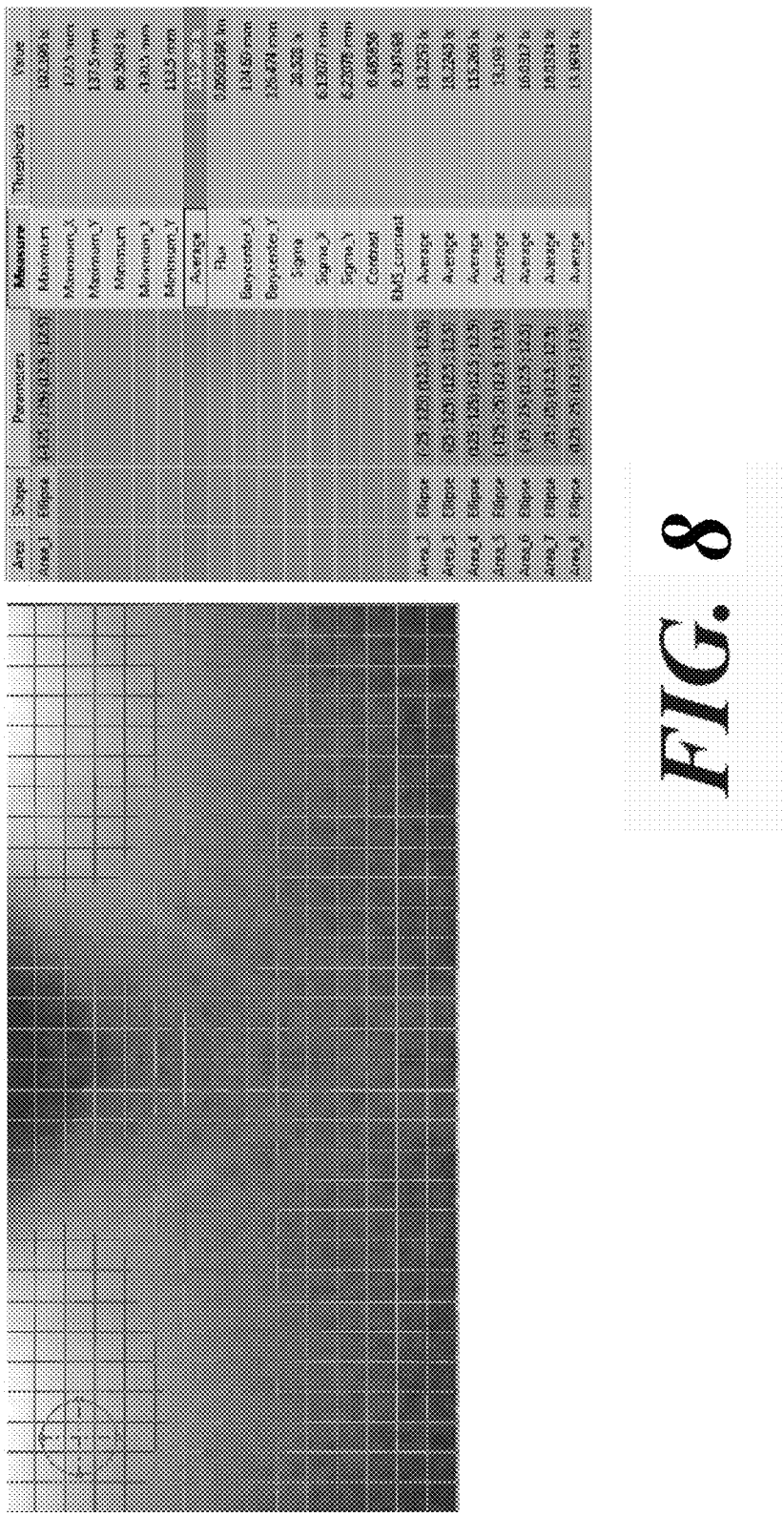
FIG. 8 is a graphical depiction of simulation data pertaining to license plate illuminance.

During operation, light from light source 80 may radiate axially and radially outwardly with respect to the longitudinal axis of the vehicle 12 (and outwardly of CCA 32). Upon reaching the curved reflector 72, this light is redirected downwardly through the housing 30 and into the cover 34 (i.e., radially downwardly with respect to longitudinal axis of the vehicle 12). This light is then refracted, reflected, or otherwise redirected onto the license plate 14 via the flutes 102 on the base 92 of cover 34. FIG. 8 shows that the arrangement of the flutes 102 may enable license plate illumination sufficient to meet the intensity and uniformity requirements of FMVSS108—e.g., showing test points with minimum illuminance of 13.2 lux (8 lux minimum required) and ratio of 8.7 (20 maximum required). The types of flutes 102 and the arrangements thereof are known to skilled artisans and will not be elaborated further here. Moreover, it should be appreciated that some implementations will use two illumination assemblies 16, 18 to achieve these requirements; and others will use a single illumination assembly (e.g., such as 16).

Figure 9:
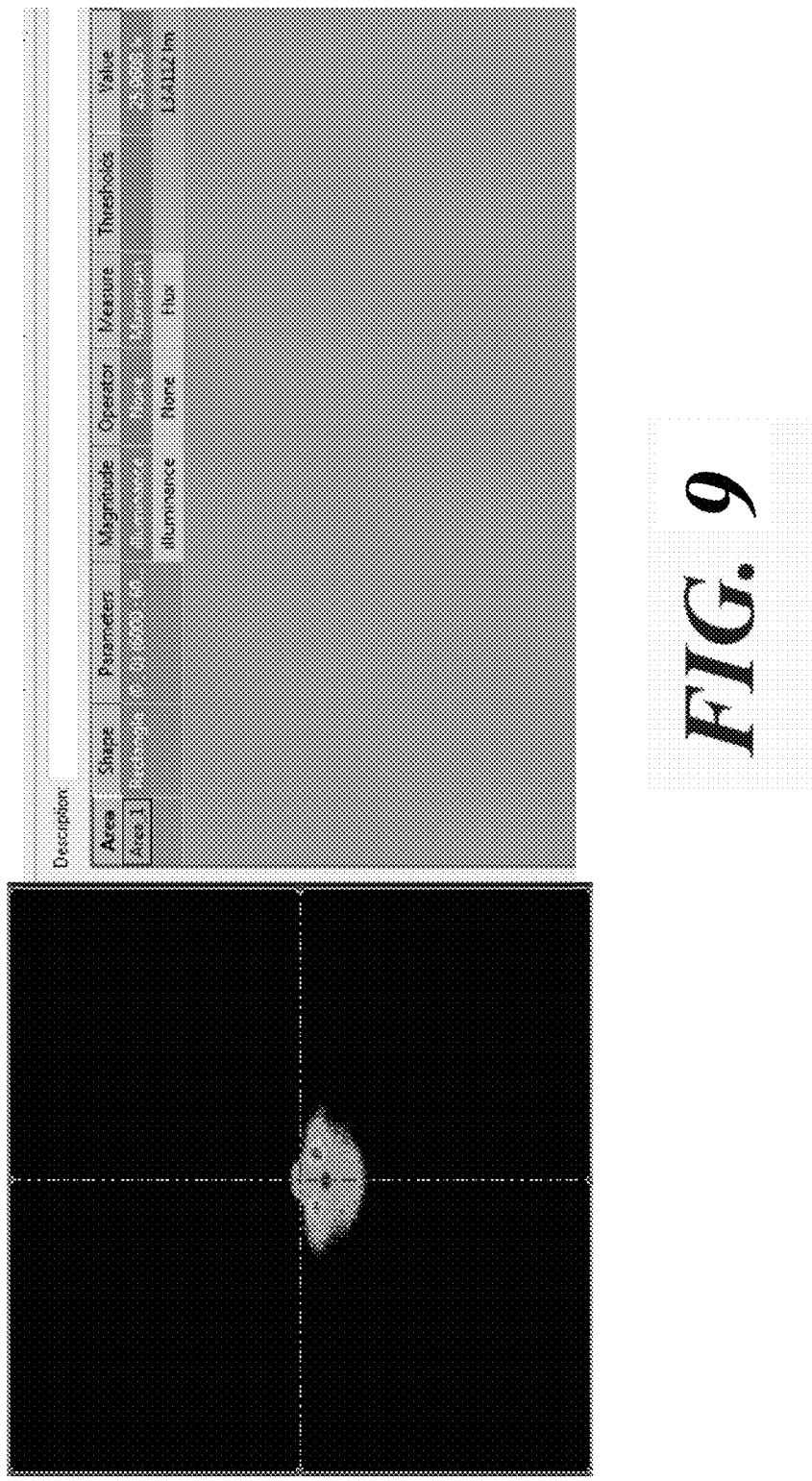
FIG. 9 is a graphical depiction of simulation data pertaining to backup camera illuminance.

Light from light source 78 is radiated axially and radially outwardly as well with respect to the longitudinal axis of the vehicle 12 (and also outwardly of CCA 32). Here, the light source 78 (and CCA) may be spaced proximate to the first end 124 of light pipe 94 so that scatter is minimized. Thus, most of this light is received by the light pipe 94 and internally reflects therein and exits at the second end 126. As discussed above, the second end 126 has a number of flutes 122 (in the optic region 120) which direct the light vehicle-rearwardly (e.g., in a cone-shaped beam). Again, one or more beams may be used (e.g., from illumination assembly 16, illumination assembly 18, or both). In either case, the beams may be directed at least partially parallel to the vehicle's longitudinal axis. In some instances, the beams may have a radially inwardly component (i.e., vehicle inboard or e.g., with respect to the vehicle's centerline). Beam direction may be based at least partially upon the arrangement of the flutes 122 so that backup camera 20 has sufficient light to provide a user of vehicle 12 rearview visibility via a display in the vehicle cabin. The shape of the beam(s) and direction thereof may be achieved using flute types and arrangements known to skilled artisans as well. FIG. 9 illustrates that in at least one simulation, a region behind vehicle 12 may be illuminated such that 70% of the light from light source 78 is directed into the region.

Figure 7:
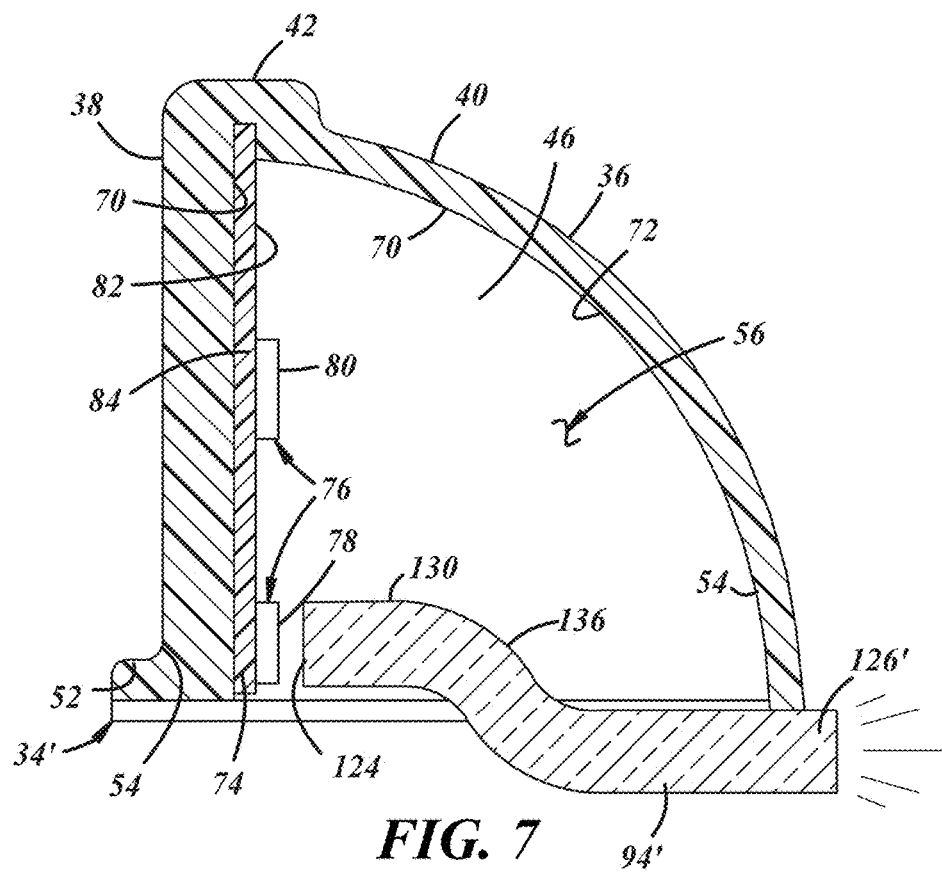
FIG. 7 is a sectional view of another embodiment of the first illumination assembly.

Other implementations also exist. For example, FIG. 7 illustrates light pipe 94' which has a curve or bend 136 along its longitudinal length. This curve enables less of the CCA 32 to protrude downwardly and be exposed to view (when installed on vehicle 12). Thus, in at least one implementation, only a portion of light pipe 94' and the second end 126' thereof drop below the bottom surface 52 of the housing 30. Other implementations could also exist. For example, in one implementation, the light pipe 94 could extend through a portion of the housing 30 (e.g., through the curved wall 40).

Figure 10:
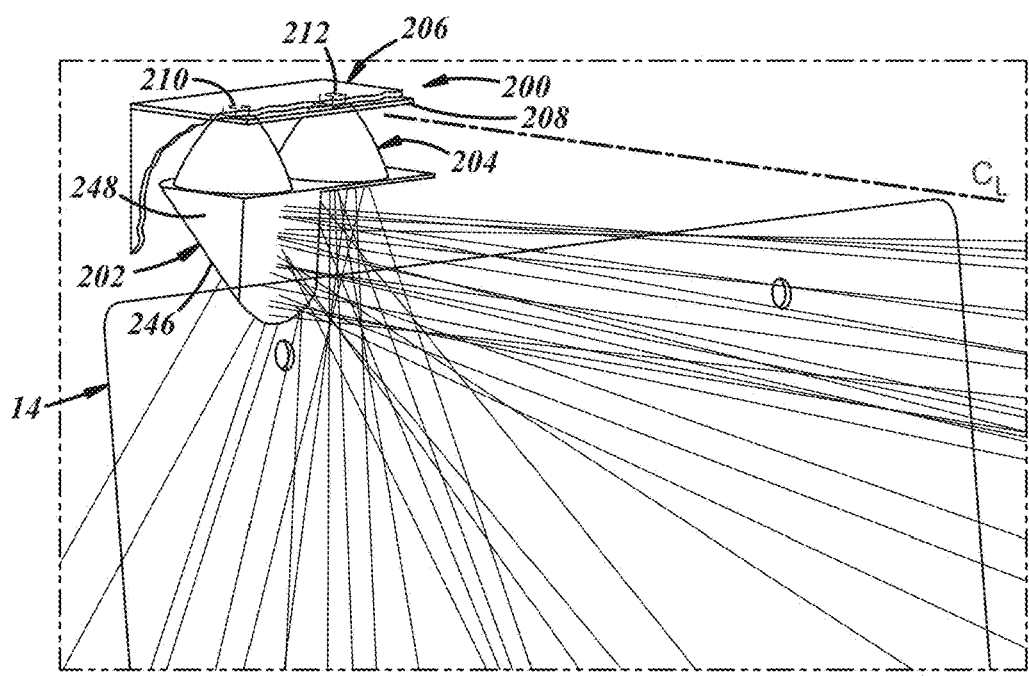
FIG. 10 is a perspective view of another embodiment of the first illumination assembly.

FIGS. 10-17 illustrate another implementation of the illumination assembly described above. More specifically, FIG. 10 illustrates license plate 14 and an illumination assembly 200 that includes a backup camera lamp (BCL) 202 and a license plate lamp (LPL) 204 offset from the longitudinal axis or centerline $C_L$ of the vehicle. The assembly 200 further may comprise a housing 206 and a control circuit card or assembly 208. The housing 206 may include one or more features or appurtenances (not shown) for coupling to BCL 202, LPL 204, and CCA 208. In addition, housing 206 may also have features or appurtenances (not shown) for coupling to the vehicle (not shown here).

CCA 208 may be similar to that described above (e.g., CCA 32). For example, CCA 208 may carry at least two light sources 210, 212—a BCL light source (210) and a LPL light source (212), as best shown in FIG. 11.

Figure 11:
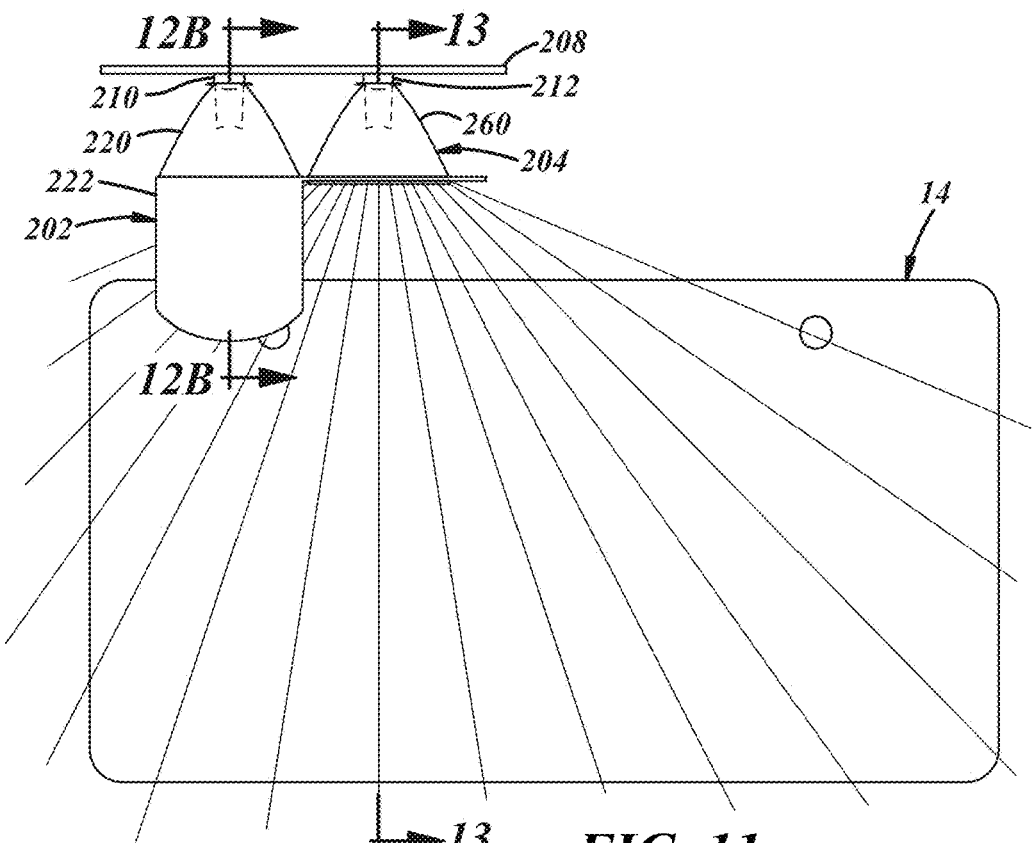
FIG. 11 is a forwardly-looking view of the first illumination assembly of FIG. 10.
Figure 12A:
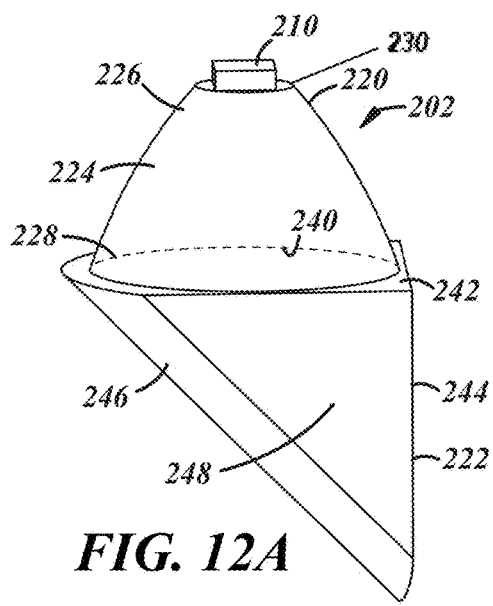
FIG. 12A is a perspective side view of the illumination assembly shown in FIG. 10.
Figure 12B:
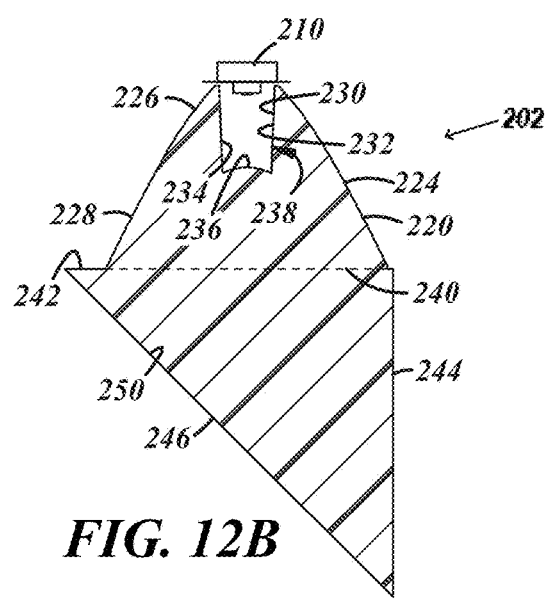
FIG. 12B is a partial sectional view of the illumination assembly shown in FIG. 11 along section lines 12B-12B.
Figure 12C:
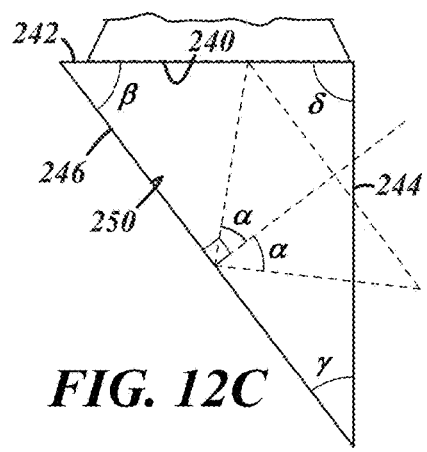
FIG. 12C is a partial schematic view of the illumination assembly shown in FIG. 12B.

As shown in FIGS. 11 (front view), 12A (side view), and 14 (top view), BCL 202 may comprise light source 210, a collimator 220, and an optical wedge 222. As best shown in FIG. 12A, collimator 220 is a dome optic. The dome optic comprises a body 224 having a narrow end 226 extending downwardly to a wide or broad end 228. The narrow end 226 has an opening 230 to a blind hole 232 sized to receive the light source 210 (see sectional view of FIG. 12B). Hole 232 may have a generally cylindrical or tapered side wall 234 and a convex base or bottom 236. Collectively, the side wall 234 and base 236 comprise a collimator light input 238. In some embodiments, light source 210 also may be coupled to any suitable portion of hole 232; in other embodiments, it is only carried by to the CCA 208. FIGS. 12A-12C illustrate a collimator output or exit boundary 240 at the broad end 228 that coincides with a light receiving surface or boundary 242 of optical wedge 222.

Optical wedge 222 may be defined by receiving boundary 242, a light transmitting or transmissive surface 244, and a light reflecting side 246 (FIG. 12A). In general, receiving boundary 242 faces upwardly with respect to vehicle 12 (e.g., generally parallel to the ground) while transmitting surface 244 is oriented vertically with respect to the vehicle (e.g., generally normal to the ground). Transmitting surface 244 may be oriented to face rearwardly with respect to the vehicle, and reflecting side 246 may face forwardly with respect to the vehicle. In addition, reflecting side 246 extends from receiving boundary 242 to transmitting surface 244. In addition, a triangular face 248 may adjoin each of the boundary 242, surface 244, and reflecting side 246 on each side of wedge 222 (see e.g., FIG. 12A). As will be explained more below, light received into the receiving boundary 242 may be reflected at an inner reflecting surface 250 which coincides with the reflecting side 246 (except that surface 250 is within wedge 222) (see FIG. 12C).

Figure 16:
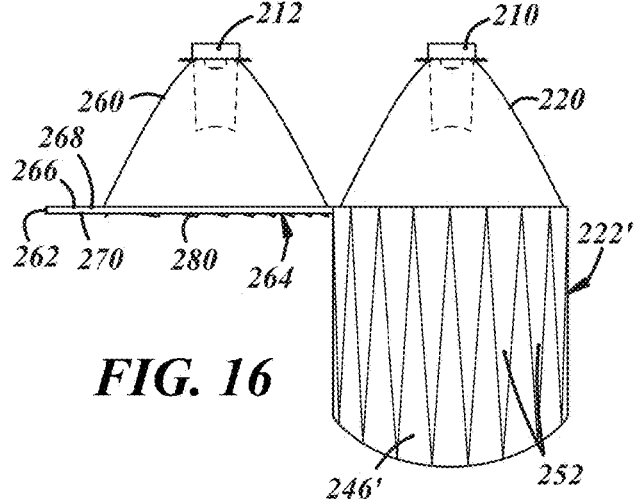
FIG. 16 is a rearward-looking view of another embodiment of the illumination assembly shown in FIG. 10.
Figure 17:
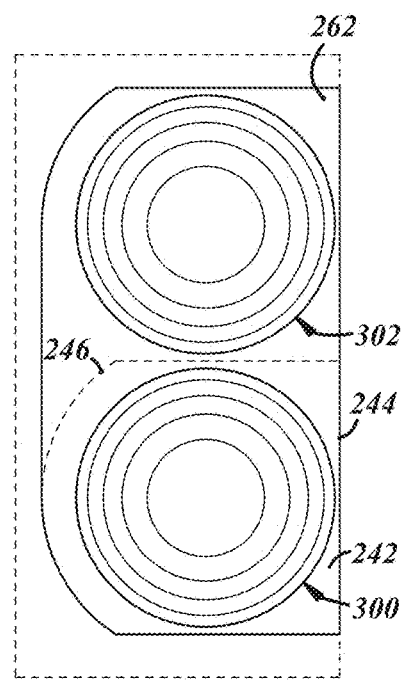
FIG. 17 is a top view of yet another embodiment of the illumination assembly shown in FIG. 10.

As best shown in FIGS. 10-11 and 12A, reflecting side 246 may be curved. In at least one embodiment, the curvature may be a smooth curve having an at least partially parabolic shape. Other embodiments of the light reflecting side 246 also exist. For example, FIG. 16 shows a partial front view of illumination assembly 200' illustrating that a reflecting side 246' of optical wedge 222' may be comprised of multiple facets or surfaces 252 (note: like numerals denoting same or like elements, features, and functions). In at least one embodiment, the facets 252 may be circumscribed within the at least partially parabolic curve.

FIG. 12C schematically illustrates the relationship between the light receiving boundary 242, reflecting side 246 (and consequently inner surface 250), and the light transmitting surface 244. For example, inner surface 250 is positioned relative to the receiving boundary 242 according to an angle ($\beta$), the transmitting surface 244 is positioned relative to the receiving boundary 242 according to an angle ($\delta$), and the transmitting surface 244 is positioned relative to inner surface 250 according to an angle ($\gamma$). FIG. 12C also illustrates two angles labeled as angle ($\alpha$) or angles of incidence relative to a local normal or 90° angle with respect to inner surface 250. In at least one implementation, angle (α) is the critical angle; i.e., it is an angle of incidence above which total internal reflection occurs; and therefore, as will be appreciated by skilled artisans, light rays which meet inner surface 250 at an angles smaller than the critical angle (α) will pass through or exit the reflecting side 246 of the wedge 222. According to one embodiment, the collimator 220 and wedge 222 are configured so that, in general, the angle (α) is 35≤angle (α)≤42.1. And when 35≤angle (α)≤42.1, the angles (β), (γ), and (δ) may vary according to the following suitable ranges: 30≤angle (β)≤50, 40≤angle (γ)≤60, and 80≤angle (δ)≤100. It will be appreciated that angles (β), (γ), and (δ) may be determined based on a desired angle (α), and angle (α) may be determined in part based on a material of the optical wedge 222; for example, according to Equation (1) below.

$$\text{Angle } (\alpha) = \sin^{-1}(1/n), \text{ where } n \text{ is the index of refraction of the material} \quad (1)$$

Figure 13:
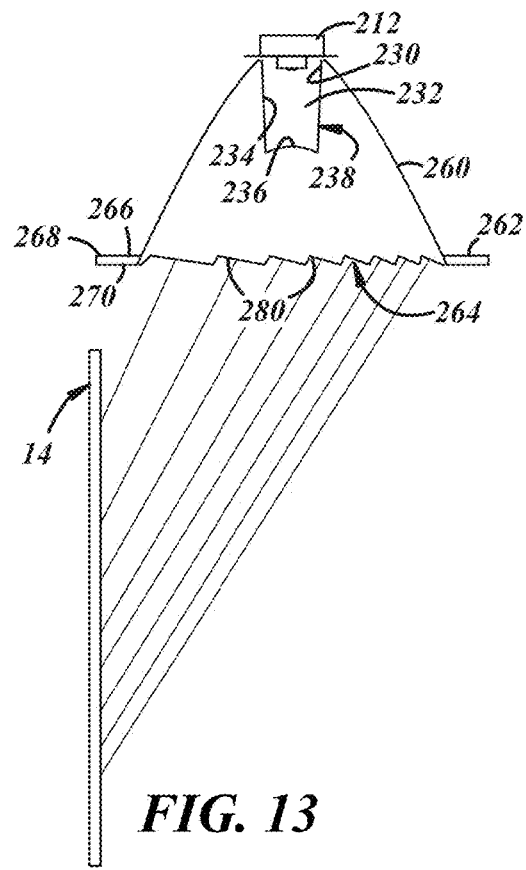
FIG. 13 is a partial sectional view of the illumination assembly shown in FIG. 11 along section lines 13-13.
Figure 14:
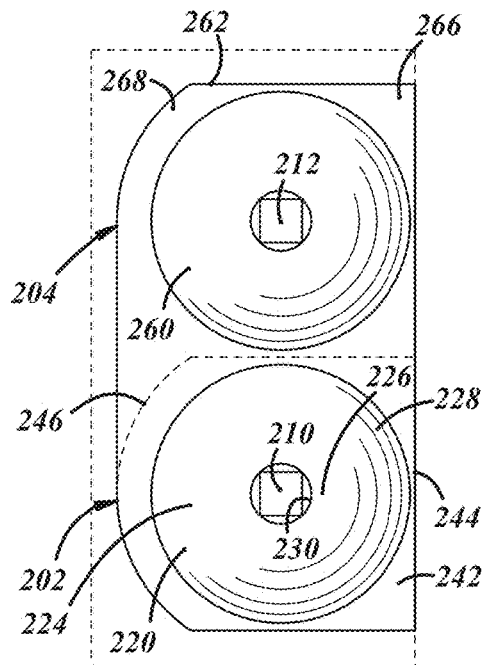
FIG. 14 is a top view of the illumination assembly of FIG. 11.

Turning now to LPL 204, FIG. 13 illustrates a sectional view of the LPL showing light rays from LPL 204 onto license plate 14. LPL 204 may comprise the light source 212, a collimator 260, a frame 262, and a lens 264. The shape of collimator 260 may be the same as or substantially similar to the BCL collimator 220 described above (e.g., including having a hole 232 and similar features adapted to receive light from light source 212). Therefore, the LPL collimator 260 will not be re-described here.

Frame 262 may extend from and/or couple to optical wedge 222 (of the BCL 202). Frame 262 may comprise a planar body 266 having an upper side 268 that supports or carries the collimator 260. A lower side 270 of the body 266 may include or be coupled to the lens 264.

Figure 15:
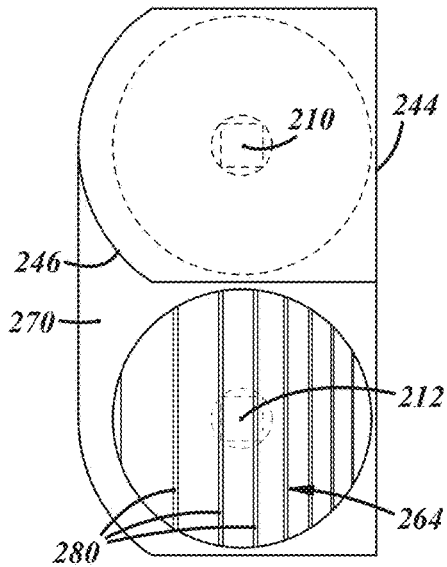
FIG. 15 is a bottom view of the illumination assembly shown in FIG. 11.

Lens 264 is best illustrated FIG. 13 and the bottom view of FIG. 15. Lens 264 may include multiple optical elements or flutes 280 for directing collimated light towards license plate 14 according to a light distribution pattern that is both adequately even and intense (e.g., per FMVSS 108). In at least one embodiment, optical elements 280 are pillow-shaped optics. Types and arrangements of optical elements 280 are known to skilled artisans and may be similar to those described above (e.g., optical elements 102 of assembly 16).

Collimator 220 and optical wedge 222 of the BCL 202 may comprise a material formed in a single-piece construction. Likewise, the collimator 260, frame 262, and lens 264 of the LPL 204 may comprise a material formed in a single-piece construction. Further, the BCL 202 and LPL 204 collectively may be formed in a single-piece construction—e.g., formed in a mold using any suitable material. In at least one implementation, the BCL 202 and LPL 204 are formed using a polymer. One such suitable polymer may be an acrylic having an index of refraction (n) of 1.492. Other suitable materials include polycarbonate (n=1.586), clear acrylonitrile butadiene styrene (ABS) (n~1.6), any of the thiourethanes used for eyeglasses (n=1.60-1.74). Of course, these are all merely examples. And in other implementations, all or part of the BCL 202 and/or LPL 204 may be machined or otherwise manufactured.

During operation of illumination assembly 200, the BCL 202 may receive un-collimated light from light source 210 (e.g., a LED) at the collimator input 238—e.g., vertically from the LED through an axis of the dome optic. This light may be collimated prior to crossing the light receiving boundary 242; i.e., as the rays enter boundary 242, the rays may be parallel. The collimated light rays then may pass through the optical wedge 222, be redirected at the inner reflecting surface 250, and then pass through the transmitting surface 244 illuminating a rearward region of interest behind the vehicle. The transmitted light may be a high-intensity region or cone of light. In at least one embodiment, BCL 202 may be configured to aim the light parallel to the ground, rather than at the ground behind the vehicle. In one embodiment, the cone of light may be defined by a transmission axis (not shown) generally parallel to the ground and an angle of divergence (i.e., a deviation from the transmission axis). In some implementations, the angle of divergence, with respect to a transmission axis parallel to the ground, is approximately 40° horizontally and 10° vertically, with respect to the axis associated with transmitting surface 244—where the measured divergence is associated with a half-intensity point. This of course is merely one example; other implementations are possible.

During operation, LPL 204 of the illumination assembly 200 likewise may receive un-collimated light, but from light source 212 (e.g., another LED) at its collimator input. Similarly, collimated light may exit the dome optic and may pass into and through frame 262. As the light exits the LPL 204, it may be refracted via lens 264 (and optical elements 280) towards license plate 14. This refracted light may provide a suitably even, predetermined distribution having a suitable intensity (and may be compliant with FMVSS 108).

Other embodiments of illumination assembly 200 also exist. In one implementation, two illumination assemblies are used (similar to that shown in FIG. 1). The second illumination assembly may be the mirror image of assembly 200 (e.g., in the second assembly, the BCL may be outboard of the LPL).

According to another embodiment (shown in FIG. 17), two Fresnel collimators 300, 302 may be used instead of dome optic collimators 220, 260. The Fresnel collimators 300, 302 may be spaced from their respective light sources 210, 212 at predetermined distance(s) (e.g., depending on the arrangement of optics/flutes thereon). Fresnel collimators are merely an example; any other suitable collimators may be used with the LPL frame 262 and lens 264, and with the optical wedge 222. Still other implementations will be apparent to skilled artisans.

Thus there has been described an illumination assembly both illuminating a vehicle license plate and illuminating a region of interest behind a vehicle. The license plate may be illuminated according to a predetermined intensity and distribution. And the region of interest may be associated with an orientation of a backup camera so that the backup camera receives more light and thus provides a better quality image to a vehicle user.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An illumination assembly for a vehicle, comprising:
   a backup camera lamp (BCL), wherein the BCL comprises:
      a first light source;
      a first collimator adapted to receive light from the first light source, the first collimator having a collimator output exit boundary; and
      an optical wedge, wherein the first collimator is positioned between the first light source and the optical wedge, the optical wedge having a light receiving surface, a light reflecting side, and a light transmitting surface, wherein the collimator output exit boundary is coincident with at least a portion of the light receiving surface, and wherein the light transmitting surface is configured to allow passage of the light from the first light source therethrough; and
   a license plate lamp (LPL), wherein the LPL comprises:
      a second light source;
      a second collimator adapted to receive light from the second light source; and
      a lens, wherein the second collimator is positioned between the second light source and the lens.

2. An illumination assembly for a vehicle, comprising:
   a backup camera lamp (BCL), wherein the BCL comprises:
      a first light source;
      a first collimator adapted to receive light from the first light source, the first collimator having a collimator output exit boundary; and
      an optical wedge, wherein the first collimator is positioned between the first light source and the optical wedge, the optical wedge having a light receiving surface, wherein the collimator output exit boundary is coincident with at least a portion of the light receiving surface; and
   a license plate lamp (LPL), wherein the LPL comprises:
      a second light source; and
      a second collimator adapted to receive light from the second light source; and
      a lens, wherein the second collimator is positioned between the second light source and the lens;
   wherein the first collimator, the optical wedge, the second collimator, and the lens are formed in a single piece of material.

3. The illumination assembly of claim 1, wherein the first light source is positioned along a first collimator axis and the second light source is positioned along a second collimator axis, wherein the axes are substantially parallel.

4. The illumination assembly of claim 1, wherein each of the first or second collimators are one of a dome optic or a Fresnel optic.

5. The illumination assembly of claim 1, wherein the lens of the LPL includes a plurality of optical elements.

6. The illumination assembly of claim 1, wherein the first and second light sources are light emitting diodes (LEDs).

7. An illumination assembly for a vehicle, comprising:
   a backup camera lamp (BCL), wherein the BCL comprises:
      a first light source;
      a first collimator adapted to receive light from the first light source; and
      an optical wedge, wherein the first collimator is positioned between the first light source and the optical wedge; and
   a license plate lamp (LPL), wherein the LPL comprises:
      a second light source; and
      a second collimator adapted to receive light from the second light source; and
      a lens, wherein the second collimator is positioned between the second light source and the lens, wherein the lens is configured to distribute and refract collimated light from the second light source and the second collimator.

8. The illumination assembly of claim 7, wherein the lens includes multiple optical elements configured to distribute and refract collimated light from the second light source and the second collimator.

9. The illumination assembly of claim 8, wherein the multiple optical elements includes multiple flutes.

10. The illumination assembly of claim 8, wherein the multiple optical elements includes pillow-shaped optics.

11. The illumination assembly of claim 8, wherein the lens is configured to distribute and refract collimated light from the second light source and the second collimator in a light distribution pattern that is compliant with Federal Motor Vehicle Safety Standard 108 (FMVSS 108).

* * * * *